US008612759B2

(12) United States Patent
Ishimoto

(10) Patent No.: US 8,612,759 B2
(45) Date of Patent: Dec. 17, 2013

(54) COMMUNICATION SYSTEM FOR COMMUNICATING DATA UTILIZING CHALLENGE DATA

(75) Inventor: Kan Ishimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1517 days.

(21) Appl. No.: 11/847,325

(22) Filed: Aug. 29, 2007

(65) Prior Publication Data

US 2008/0059796 A1   Mar. 6, 2008

(30) Foreign Application Priority Data

Aug. 29, 2006   (JP) .................................. 2006232002

(51) Int. Cl.
*H04L 9/32*   (2006.01)
*H04L 9/00*   (2006.01)
*G06F 7/04*   (2006.01)

(52) U.S. Cl.
USPC ................. 713/168; 726/5; 726/26; 380/262; 380/267

(58) Field of Classification Search
USPC .................. 713/168; 726/5, 26; 380/262, 267
See application file for complete search history.

(56) References Cited

U.S. PATENT DOCUMENTS

| 5,734,718 | A | 3/1998 | Prafullchandra |
| 5,826,016 | A | 10/1998 | Ito et al. |
| 6,769,060 | B1 | 7/2004 | Dent et al. |
| 7,039,190 | B1 | 5/2006 | Engwer et al. |
| 2003/0070067 | A1 | 4/2003 | Saito |
| 2003/0074567 | A1* | 4/2003 | Charbonneau ................ 713/186 |
| 2003/0093680 | A1 | 5/2003 | Astley et al. |
| 2004/0081320 | A1 | 4/2004 | Jordon et al. |
| 2005/0149730 | A1 | 7/2005 | Aissi et al. |
| 2006/0036857 | A1* | 2/2006 | Hwang ......................... 713/168 |
| 2006/0215703 | A1* | 9/2006 | Honda .......................... 370/474 |
| 2006/0265334 | A9* | 11/2006 | Cutter et al. .................... 705/59 |

(Continued)

FOREIGN PATENT DOCUMENTS

| JP | H08-320847 A | 12/1996 |
| JP | H09-231174 A | 9/1997 |

(Continued)

OTHER PUBLICATIONS

European Patent Office, European Search Report for EP Appl'n No. 07253399 mailed Nov. 28, 2007.

(Continued)

*Primary Examiner* — Aravind Moorthy
(74) *Attorney, Agent, or Firm* — Baker Botts L.L.P.

(57) ABSTRACT

A communication system includes an information processing device and a management device including a challenge input device, an encryption device, and a combination data output device. The challenge input device inputs challenge data output by the information processing device. The encryption device creates combination data including the challenge data and the predetermined data, and encrypts the combination data in units of blocks. The encryption device creates the combination data such that at least one block of the combination data includes both at least a part of the challenge data and at least a part of the predetermined data. The combination data output device outputs the combination data encrypted by the encryption device to the information processing device. The information processing device is provided with a challenge output device, a challenge storage, a combination data input device, a decryption device, and a data utilizing device.

9 Claims, 13 Drawing Sheets

(56) References Cited

U.S. PATENT DOCUMENTS

| | | |
|---|---|---|
| 2007/0036353 A1* | 2/2007 | Reznik et al. .................. 380/30 |
| 2007/0120651 A1* | 5/2007 | Kobayashi et al. ........ 340/10.51 |
| 2007/0220261 A1 | 9/2007 | Farrugia et al. |
| 2008/0059810 A1 | 3/2008 | Ishimoto |
| 2009/0113522 A1 | 4/2009 | Crassous et al. |

FOREIGN PATENT DOCUMENTS

| | | |
|---|---|---|
| JP | 2000-059355 A | 2/2000 |
| JP | 2001-265731 A | 9/2001 |
| JP | 2001-265735 A | 9/2001 |
| JP | 2001288079 A | 10/2001 |
| JP | 2002-330122 A | 11/2002 |
| JP | 2004184567 A | 7/2004 |
| JP | 2005-114870 A | 4/2005 |
| JP | 2005-509938 A | 4/2005 |
| JP | 2005-252347 A | 9/2005 |
| WO | 2005089088 A | 9/2005 |

OTHER PUBLICATIONS

Japan Patent Office; Notice of Reasons for Rejection in Japanese Patent Application No. 2006-232002 mailed Apr. 14, 2009.

Japanese Patent Office, Notice of Reasons for Rejection for Japanese Patent Application No. 2006-232001 (counterpart to co-pending U.S. Appl. No. 11/847,235, filed Aug. 29, 2007), mailed Jul. 22, 2008.

Japanese Patent Office, Notification of Reasons for Rejection for Japanese Patent Application No. 2006-232002, mailed Sep. 9, 2008.

U.S. Patent & Trademark Office, Office Action for co-pending U.S. Appl. No. 11/847,235, filed Aug. 29, 2007.

European Patent Office, Office Action for European Patent Application No. 07253399.5, dated Apr. 10, 2012.

United States Patent and Trademark Office, Final Office Action for U.S. Appl. No. 11/847,235, mailed Jun. 23, 2011.

* cited by examiner

CL = Data Size of Callenge Data Included in One Block
CPL = Data Size of Dummy Data for Callenge
DL = Data Size of Password Included in One Block
DPL = Data Size of Dummy Data for Password

US 8,612,759 B2

COMMUNICATION SYSTEM FOR COMMUNICATING DATA UTILIZING CHALLENGE DATA

CROSS-REFERENCE TO RELATED APPLICATION

This application claims priority to Japanese Patent Application No. 2006-232002, filed on Aug. 29, 2006, the contents of which are hereby incorporated by reference into the present application.

BACKGROUND OF THE INVENTION

1. Field of the Invention

The present invention relates to a communication system comprising an information processing device and a management device that will output data to the information processing device. In particular, the present invention relates to a system in which encrypted data will be transmitted from the management device to the information processing device.

2. Description of the Related Art

The transmission of data between devices located on a network is widely performed. Technology referred to as challenge identification is sometimes used for identification between devices (e.g., US Patent Application Publication No. 2003/0070067). In addition, encrypting data and then transmitting the same is widely performed. Technology that encrypts data in units of blocks (each block having a unit data size (predetermined data size)) is known (e.g., Japanese Patent Application Publication No. 2004-184567).

BRIEF SUMMARY OF THE INVENTION

In network communication, data will sometimes be damaged in the step of transmitting the data. For example, there is a possibility that data will be altered during data transmission. In the present specification, technology will be disclosed that can know whether or not data transmitted between a management device and an information processing device has been altered.

Technology disclosed in the present specification will be described with reference to FIG. 1. FIG. 1 shows an example of a communication system. Note that FIG. 1 is merely an example. The scope of the technology disclosed in the present specification should not be narrowly interpreted by the content of FIG. 1 and the following explanation related thereto. The scope of the present invention is to be objectively construed by the contents disclosed in the claims. A communication system 2 comprises an information processing device 25, and a management device 10 capable of outputting predetermined data (which will hereinafter use reference numeral D2) to the information processing device 25.

The management device 10 comprises a challenge input device 14, an encryption device 16, and a combination data output device 18. The challenge input device 14 inputs challenge data CD output by the information processing device 25. "Challenge data" is data for confirming that data communication has been safely performed between the information processing device 25 and the management device 10. The "challenge data" may be data in any format. The encryption device 16 creates combination data (CD+D2) that is a combination of the challenge data CD input to the challenge input device 14 and the aforementioned predetermined data D2, and encrypts the combination data (CD+D2) in units of blocks. Each block has a unit data size. The aforementioned predetermined data may be input by a user into the management device 10, may be sent from an external device to the management device 10, or may be stored in advance in the management device 10. Note that in the following, the encrypted combination data will be expressed as E(CD+D2).

The aforementioned encryption device 16 creates the combination data (CD+D2) such that at least one block of the combination data (CD+D2) includes both at least a part of the challenge data CD and at least a part of the predetermined data D2. FIG. 2 shows an example of the combination data (CD+D2). In the example of FIG. 2, three blocks 40$a$, 40$b$, and 40$c$ will be used to encrypt the combination data. The block 40$b$ includes both a part of the challenge data CD and a part of the predetermined data D2. The combination data output device 18 outputs the combination data E(CD+D2) encrypted by the encryption device 16 to the information processing device 25.

The information processing device 25 comprises a challenge output device 30, a challenge storage 32, a combination data input device 34, a decryption device 36, and a data utilizing device 38. The challenge output device 30 outputs the challenge data CD to the management device 10. The information processing device 25 may produce challenge data CD by, for example, randomly selecting one number. The challenge storage 32 stores the challenge data CD output by the challenge output device 30. The combination data input device 34 inputs the encrypted combination data E(CD+D2) output by the management device 10. The decryption device 36 decrypts the encrypted combination data E(CD+D2) input into the combination data input device 34 in units of the blocks. The data utilizing device 38 compares the challenge data CD included in the combination data (CD+D2) decrypted by the decryption device 36 and the challenge data CD stored in the challenge storage 32. In a case where both challenge data are identical, the data utilizing device 38 utilizes the predetermined data D2 included in the combination data (CD+D2) decrypted by the decryption device 36. On the other hand, in a case where both challenge data are not identical, the data utilizing device 38 is prohibited from utilizing the predetermined data D2 included in the combination data (CD+D2).

An attempt to attack the aforementioned predetermined data D2 may occur while the combination data E(CD+D2) is being transmitted in order to alter the data D2. In the communication system 2, both at last a part of the challenge data CD and at least a part of the predetermined data D2 are included in at least one block of the encrypted combination data E(CD+D2). In the example of FIG. 2, both the challenge data CD and the predetermined data D2 are included in the block 40$b$. In the event that the block 40$b$ has been altered, the challenge data CD included in the block 40$b$ will change. In this case, this changed challenge data CD' will not match the challenge data CD stored in the challenge storage 32. In this way, the information processing device 25 can know that the combination data E(CD+D2) has been altered.

DETAILED DESCRIPTION OF THE PREFERRED EMBODIMENT

First Embodiment

Figure 8:
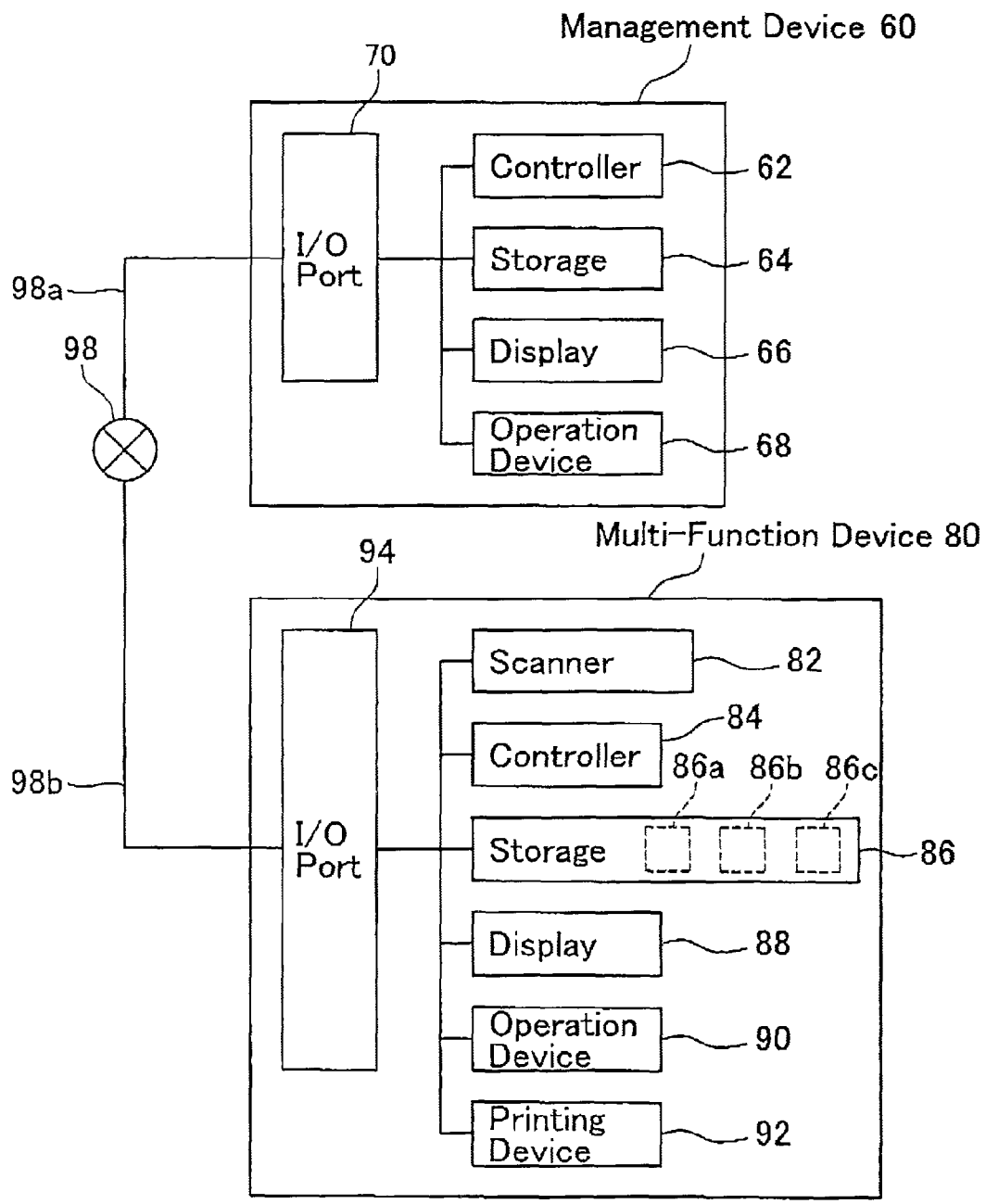
FIG. 8 shows a communication system of an embodiment.

An embodiment of the present invention will be described with reference to the drawings. FIG. 8 shows a communication system 55 of the present embodiment. The communication system 55 has a management device 60 and a multi-function device 80. The management device 60 and the multi-function device 80 are communicably connected together by means of the Internet 98.

(Construction of the Management Device)

The management device 60 has a controller 62, a storage 64, a display 66, an operation device 68, an input/output port 70, etc. The controller 62 includes a CPU etc. The controller 62 will comprehensively control each process that the management device 60 performs. The storage 64 includes ROM, RAM, EEPROM, etc. The storage 64 stores programs that allow the controller 62 to perform each process. The storage 64 stores programs for outputting a password that was input by a user to the multi-function device 80, programs for updating the password of management device 60 stored in the multi-function device 80, etc. In addition, the storage 64 can temporarily store data used in the steps performed by each process. The display 66 is comprised of a liquid crystal display, etc. The display 66 can display various types of data. The operation device 68 includes a mouse, keyboard, etc. A user can input various types of data into the management device 60 by operating the operation device 68. An internet line 98a is connected to the input/output port 70. The management device 80 is connected to the Internet 98 via the internet line 98a. Note that in FIG. 8, only one management device 60 is illustrated. However, a plurality of management devices 60 is actually present. Each of the plurality of management devices 60 is connected to the Internet 98. The plurality of management devices 60 share usage of the multi-function device 80 described below.

(Construction of the Multi-Function Device)

The multi-function device 80 has a scanner 82, a controller 84, a storage 86, a display 88, an operation device 90, a printing device 92, an input/output port 94, etc. The scanner 82 has a CCD (Charge Coupled Device) or a CIS (Contact Image Sensor). The scanner 82 will scan a document to produce image data. The controller 84 includes a CPU etc. The controller 84 will comprehensively control each process that the multi-function device 80 performs. The storage 86 includes ROM, RAM, EPROM, etc. The storage 86 stores programs that allow the controller 84 to execute each process, and temporarily stores data used in the steps of each process that will be executed. The storage 86 of the present embodiment has at least a challenge storage area 86a, a password storage area 86b, and a reproduction rule storage area 86c. Data stored by the challenge storage area 86a will be described in detail below. The password storage area 86b stores a combination of a login ID and password for logging the multi-function device 80. The password storage area 86b stores the combination of the login ID and password with respect to each management device 60. For example, when the login ID of the management device 60 is "XXX60" and the password is "YYYYY", a combination of "XXX60" and "YYYYY" is stored. The storage content of the reproduction rule storage area 86c will be described in detail below. The display 88 is comprised of a liquid crystal display, etc. The display 88 can display various types of data. The operation device 90 includes a plurality of keys. A user can input various types of data into the multi-function device 80 by operating the operation device 90. The printing device 92 will print image data created by the scanner 82 onto print media. An internet line 98b is connected to the input/output port 94. The multi-function device 80 is connected to the Internet 98 via the internet line 98b. The multi-function device 80 is connected to the plurality of management devices 60 via the Internet 98.

As noted above, the combination of the login ID and password is stored in the password storage area 86b of the multi-function device 80. A user of the management device 60 can use the operation device 68 to input the ID and password stored by the user into the management device 60. The management device 60 will output the inputted ID (e.g., "XXX60") and the inputted password (e.g., "YYYYY") to the multi-function device 80. The multi-function device 80 will determine whether or not the combination of the ID "XXX60" and the password "YYYYY" output from the management device 60 is stored in the password storage area 86b. In other words, the multi-function device 80 will perform user identification. The multi-function device 80 will perform processes in response to commands front the management device 60 in the case where user identification was successful. For example, the multi-function device 80 will change each type of setting data stored therein in response to commands from the management device 60. The multi-function device 80 will not perform the processes in response to commands from the management device 60 in the case where user identification was not successful. Note that it is preferable for a password sent from the management device 60 to the multi-function device 80 to be encrypted. The method of encryption to be employed here is a publicly known method. In addition, UDP/IP will be used to transmit data such as a password or the like between the management device 60 and the multi-function device 80.

A user of the management device 60 can change a password stored in the multi-function device 80. For example, in the case where a combination of the ID "XXX60" and password "YYYYY" is stored in the multi-function device 80, a user of the management device 60 can change the password "YYYYY" to a new password "ZZZZZ". The process that will be executed by the management device 60 and the multi-function device 80 when a password stored in the multi-function device 80 is to be changed (hereinafter referred to as a password updating process) will be described below.

(The Password Updating Process)

Figure 9:
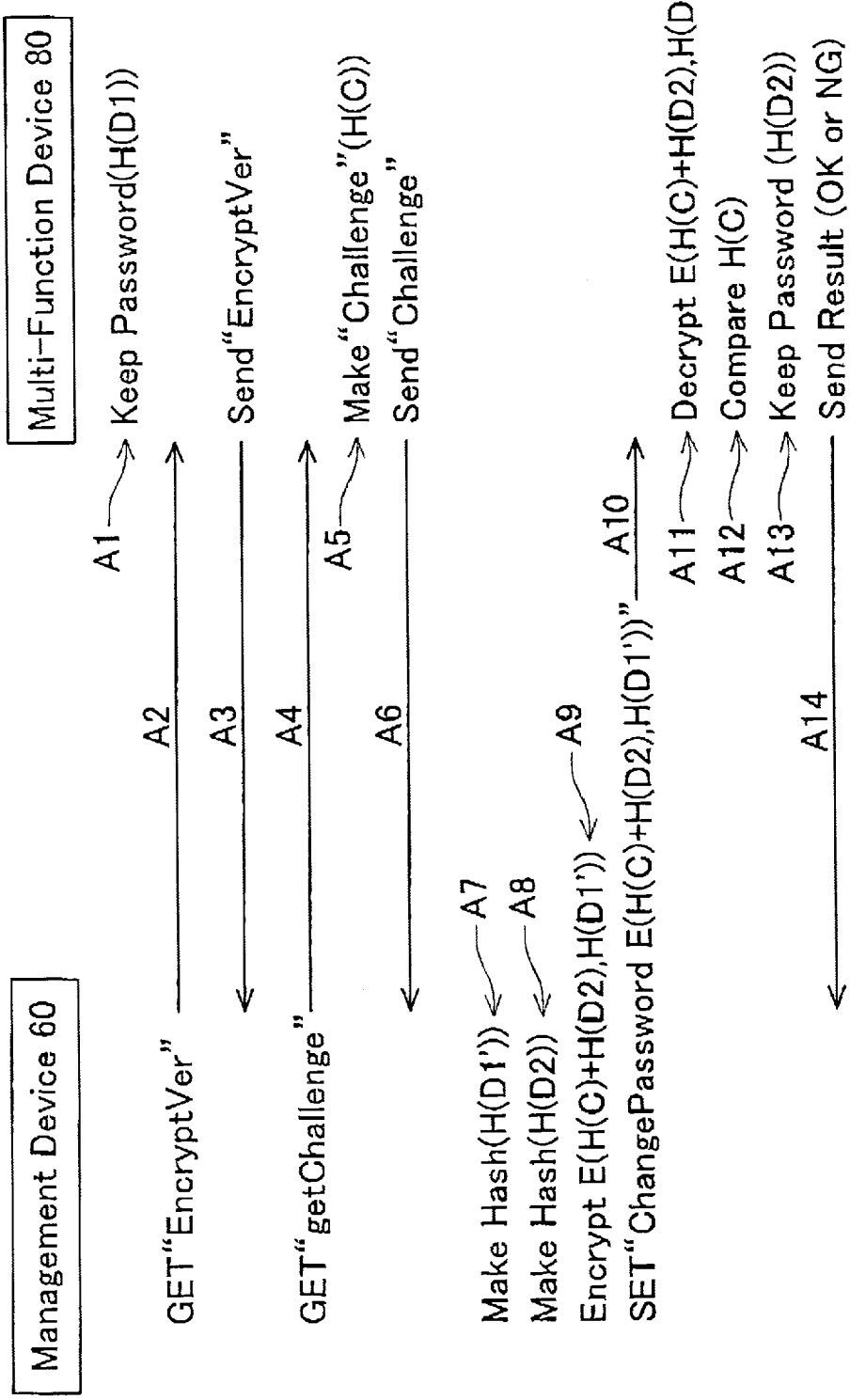
FIG. 9 shows a time chart of a password updating process.

First, an example of the password updating will be described. FIG. 9 shows a time chart of the password updating process executed by the management device 60 and the multi-function device 80.

(A1) The password of the management device 60 is stored in the password storage area 86b of the multi-function device 80 (see FIG. 8). The password has been hashed (digested). If data is hashed, it will become a constant quantity, regardless of the quantity of the data. In the present embodiment, a SHA1 hash function (Secure Hash Algorithm 1) will be used to hash the data (in the case where SHA1 is used, the data will become 20 bytes after being hashed). A combination of the ID and hashed password H(D1) of the management device 60 is stored in the password storage area 86b.

(A2) If a user commands the management device 60 to update the password stored in the multi-function device 80, the management device 60 will query the multi-function device 80 as to whether or not the multi-function device 80 supports the encryption.

(A3) In the case where the multi-function device 80 supports the encryption, data indicating the encryption version will be output to the management device 60. In the case where the multi-function device 80 does not support the encryption, data indicating the non-encryption version will be output to the management device 60. Note that the description below will continue under the assumption that the multi-function device 80 supports (corresponds to) the encryption.

(A4) The management device 60 will request the multi-function device 80 to output challenge data.

(A5) The multi-function device 80 will create challenge data (a random number). The multi-function device 80 will hash the challenge data. The hashed challenge data will be hereinafter expressed as H(C). The hashed challenge data H(C) will be stored in the challenge storage area 86a (see FIG. 8).

(A6) The multi-function device 80 will output the hashed challenge data H(C) to the management device 60.

(A7) When a user is to update (change) a password stored in the multi-function device 80, the current password (i.e., the old password) for the management device 60 will be input into the management device 60. In the present specification, the current password will be expressed as D1. However, there is a possibility that a user inputs the incorrect password. The current password input by a user into the management device 60 will be hereinafter expressed as D1'. The management device 60 will hash the inputted old password D1'. The hashed old password will be hereinafter expressed as H(D1').

(A8) The user will input a new password D2 into the management device 60. The management device 60 will hash the inputted new password D2. The hashed new password will be hereinafter expressed as H(D2).

(A9) The management device 60 will encrypt data that is the combination of the challenge data H(C) input in A6 and the new password H(D2) created in A8 by utilizing the old password H(D1') created in A7 as a key. The construction of the combination data will be described in detail below. Note that the encrypted combination data will be hereinafter expressed as E(H(C)+H(D2), H(D1')).

(A10) The management device 60 will output the encrypted combination data E(H(C)+H(D2), H(D1')) to the multi-function device 80.

(A11) The multi-function device 80 will decrypt the encrypted combination data E(H(C)+H(D2), H(D1')) by utilizing the old password H(D1) stored in the password storage area 86b (see FIG. 8) as a key.

(A12) The multi-function device 80 will compare the challenge data H(C) included in the decrypted combination data (H(C)+H(D2)) with the challenge data H(C) stored in the challenge storage area 86a in A5. In the case where that the old password D1' that was input into the management device 60 by the user is the correct password D1, and the combination data E(H(C)+H(D2), H(D1')) was not altered during data transmission in A10, the two challenge data should match. On the other hand, in the case where the old password D1' that was input into the management device 60 by the user was not the correct password D1, the key (D1') for encrypting the combination data (H(C)+H(D2)) will not match the key (D1) for decryption. In this case, the decrypted challenge data will not match the challenge data stored in the challenge storage area 86a. In addition, in the case where the combination data E(H(C)+H(D2), H(D1')) was altered during data transmission in A10, the challenge data included in the combination data will become altered. In this case as well, the decrypted challenge data will not match the challenge data stored in the challenge storage area 86a.

(A13) In the case where the two challenge data compared in A12 match, the multi-function device 80 will update the old password H(D1) stored in the password storage area 86b (see FIG. 8) to the new password H(D2) included in the decrypted combination data (H(C)+H(D2)).

(A14) The multi-function device 80 will output to the management device 60 whether or not the update of password was allowed.

(Password Updating Process of the Management Device)

Figure 10:
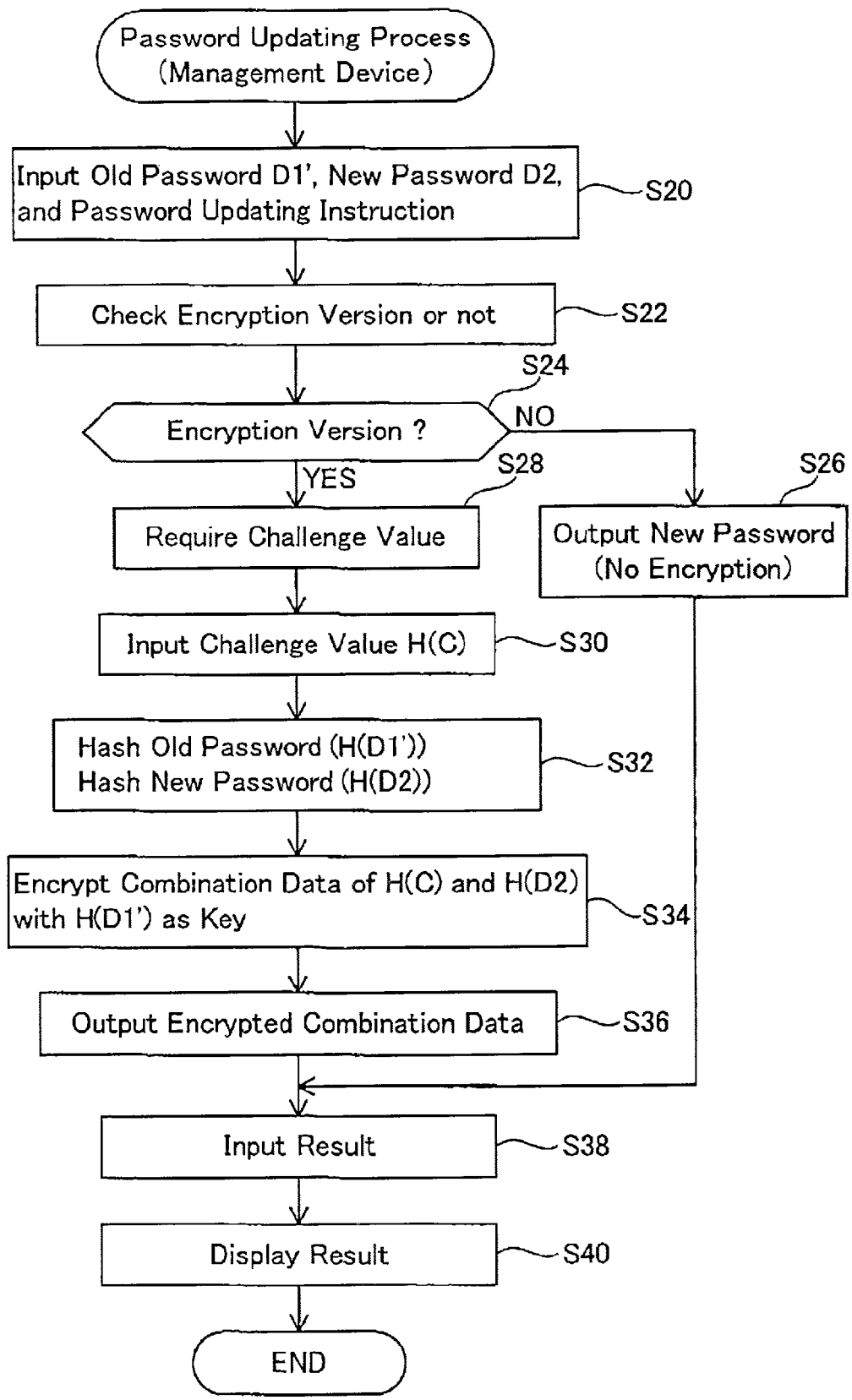
FIG. 10 shows a flowchart of a password updating process of a management device.

Next, the password updating process performed by the management device 60 will be described in detail. FIG. 10 shows the flowchart of the password updating process of the management device 60. The following process will be performed by the controller 62 (see FIG. 8) of the management device 60. A user of the management device 60 can input the current password (the old password), the new password, and a password updating instruction into the management device 60 by operating the operation device 68 (see FIG. 8). The management device 60 will input the old password D1', the new password D2, and the password updating instruction (S20). The management device 60 will query whether or not the multi-function device 80 supports the encryption (S22). This process corresponds to A2 of FIG. 9. The management device 60 will determine whether or not the multi-function device 80 supports the encryption (S24). In the case where the answer is NO here, the management device 60 will output the new password D2 to the multi-function device 80 (S26). The new password D2 will not be hashed when output, and will not be encrypted with the old password D1' as a key. When S26 is performed, the multi-function device 80 will update the old password D1 to the new password D2 Note that in S26, it is preferred that the old password D1' that was input by a user is output to the multi-function device 80. In this case, the multi-function device 80 will hash the old password D1'. In the case where the hashed old password H(D1') is stored in the password storage area 86b (see FIG. 8), it is preferable that the hashed old password D1 is updated to the hashed new password D2 in the multi-function device 80.

In the case where the answer is YES in S24, the management device 60 will order the multifunction device 80 to output the challenge data (S28). In this way, the challenge data H(C) will be sent from the multi-function device 80 to the management device 60. The process of S28 corresponds to A4 of FIG. 9. The management device 60 will input the challenge data H(C) (S30). The management device 60 will hash the old password D1' that was input in S20 (S32). In this way, the hashed old password H(D1') will be created. Furthermore, the management device 60 will hash the new password D2 that was input in S20 (S32). In this way, the hashed new password H(D2) will be created. The process of S32 corresponds to A7 and A8 of FIG. 9. The management device 60 will create data (H(C)+(D2)) that is a combination of the challenge data H(C) and the new password H(D2). The management device 60 will encrypt the combination data (H(C)+

(D2)) with the old password H(D1) as a key (S34). The process of S34 corresponds to A9 of FIG. 9.

Figure 11A:
FIG. 11A shows hashed challenge data.
Figure 11B:
FIG. 11B shows a hashed new password.
Figure 11C:
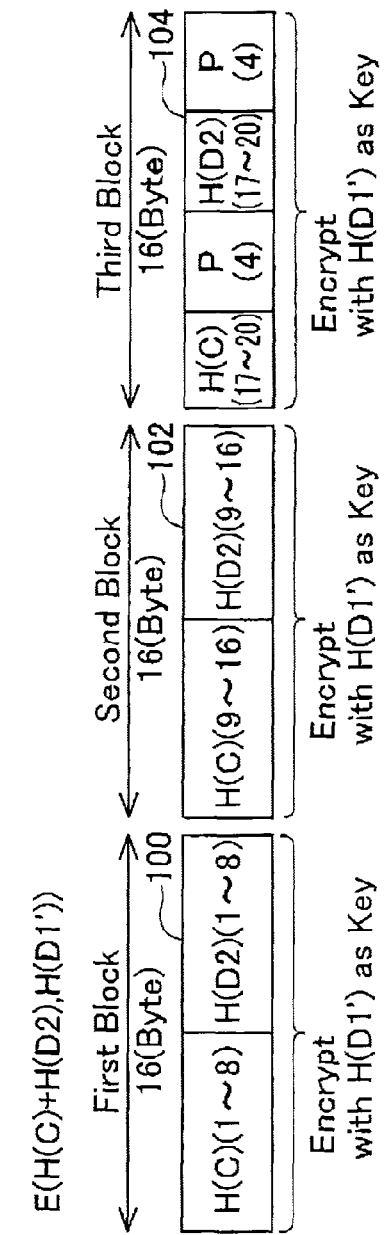
FIG. 11C shows combination data.

The content of the process of S34 will be described in detail with reference to FIG. 11. FIG. 11A shows the hashed challenge data H(C). The challenge data H(C) is 20 bytes. FIG. 11B shows the hashed new password H(D2). The new password H(D2) is 20 bytes. Note that the challenge data H(C) and the new password H(D2) will both become 20 bytes in order to use the SHA1. FIG. 11C shows the encrypted combination data E(H(C)+H(D2), H(D1')). The combination data E(H(C)+H(D2), H(D1')) will be created as described below.

(1) The 20 byte challenge data H(C) will be divided into a first divided challenge data from the first byte to the eighth byte, a second divided challenge data from the ninth byte to the sixteenth byte, and a third divided challenge data from the seventeenth byte to the twentieth byte.

(2) The 20 byte new password H(D2) will be divided into a first divided password data from the first byte to the eighth byte, a second divided password data from the ninth byte to the sixteenth byte, and a third divided password data from the seventeenth byte to the twentieth byte.

(3) Combination data arranged in the order of the first divided challenge data, the first divided password data, the second divided challenge data, the second divided password data, the third divided challenge data, and the third divided password data, will be created. The total quantity of this combination data will be 40 bytes.

(4) In the present embodiment, AES (Advanced Encryption Standard) will be used to encrypt the combination data in block units. The data quantity of one block to be encrypted with AES is a predetermined fixed value (e.g., 16 bytes. An example using 16 bytes will be described below). As noted above, the total quantity of this combination data will be 40 bytes. If the combination data is not a multiple of 16 bytes, it cannot be encrypted in block units. Because of this, 4 bytes of challenge dummy data will be added between the third divided challenge data and the third divided password data. In addition, and 4 bytes of password dummy data will be added after the third divided password data. In this way, the total quantity of combination data will be 48 bytes, and the combination data can be encrypted by three blocks 100, 102, and 104.

(5) Each block data 100, 102, and 104 will be encrypted with the old password H(D1') as a key. In order to encrypt one block data (e.g., 100) utilizing AES, a key for a predetermined quantity of data will be needed (this will be a key for 16 bytes in the present embodiment). In contrast, the old password H(D1') is 20 bytes. In the present embodiment, the first byte to the sixteenth byte of the old password H(D1') will be used as a key. In other words, the seventeenth byte to the twentieth byte of the old password H(D1') will not be used as a key.

The encrypted combination data E(H(C)+H(D2), H(D1')) includes three block data 100, 102, and 104. The first block data 100 includes eight bytes of the first divided challenge data and eight bytes of the first divided password data. The second block data 102 includes eight bytes of the second divided challenge data and eight bytes of the second divided password data. The third block data 104 includes four bytes of the third divided challenge data, four bytes of the challenge dummy data, four bytes of the third divided password data, and four bytes of the password dummy data. Both the divided challenge data and the divided password data are included in each of the block data 100, 102, and 104. In each block data 100, 102, and 104, the quantity of data in the divided challenge data and the divided password data included therein is the same.

When the encryption process of FIG. 10 (S34) is complete, the management device 60 will output the encrypted combination data E(H(C)+H(D2), H(D1')) to the multi-function device 80 (S36). In this way, a process in which the old password H(D1) is updated with the new password H(D2) is performed by the multi-function device 80. The process of S36 corresponds to A10 of FIG. 9. The management device 60 will input the result of the password updating process that was output from the multi-function device 80 (S38). The result of the password updating process is data indicating whether or not the password has been property updated. The management device 60 will display the result of the password updating process on the display device 66 (see FIG. 8) (S40).

(Challenge Creating Process of the Multi-Function Device)

Figure 12:
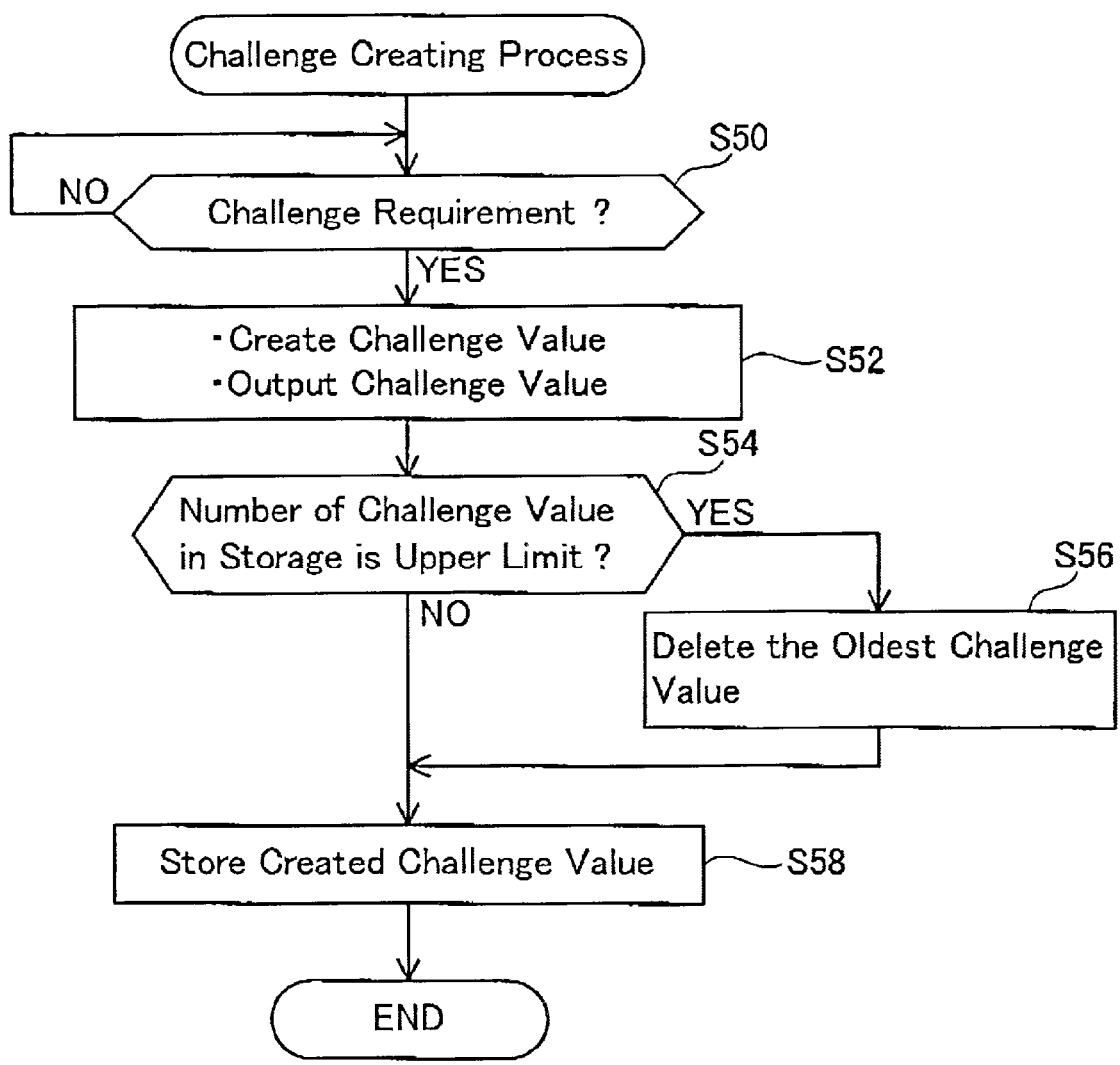
FIG. 12 shows a flowchart of a challenge creating process of a multi-function device.

Next, the challenge creating process performed by the multi-function device 80 will be described in detail. FIG. 12 shows the flowchart of the challenge creating process. The following process will be performed by the controller 84 (see FIG. 8) of the multi-function device 80. The multifunction device 80 will monitor whether or not the challenge data has been requested to be output from the management device 60. It will be determined that the answer is YES if the command output from the management device 60 in S28 of FIG. 10 is input. In the case where the answer is YES in S850, the multi-Function device 80 will produce a random number to acquire one random value (S52). This random value is challenge data (a challenge value). The multi-function device 80 will hash the challenge data in the process of S52. In this way, the hashed challenge data H(C) will be produced. In addition, the multi-function device 80 will output the challenge data H(C) to the management device 60. The process of S52 corresponds to A5 and A6 of FIG. 9. Next, the multi-function device 80 will determine whether or not the number of challenge data stored in the challenge storage area 86a of the storage 86 (see FIG. 8) exceeds an upper limit (e.g., 10). In the case where the answer is YES here, the oldest challenge data will be deleted from the challenge storage area 86a (S56). The multi-function device 80 will store the challenge data produced in S52 in the challenge storage area 86a (S58).

(Password Updating Process of the Multi-Function Device)

Figure 13:
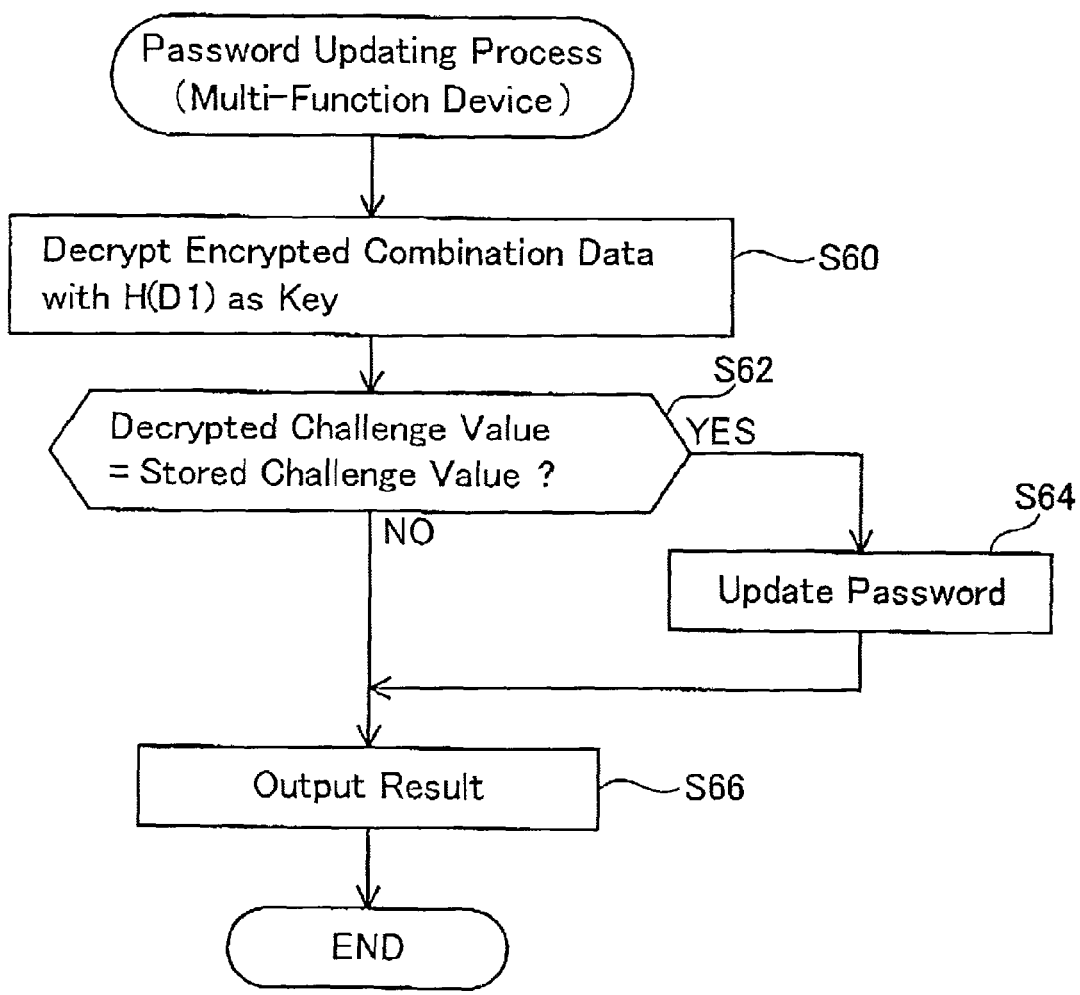
FIG. 13 shows a flowchart of a password updating process of the multi-Function device.

Next, the password updating process performed by the multi-function device 80 will be described in detail. FIG. 13 shows the flowchart of the password updating process. The following process will be performed by the controller 84 (see FIG. 8) of the multi-function device 80. The multi-function device 80 will perform the password updating process when the combination data E(H(C)+H(D2), H(D1')) that was output from the management device 60 in S36 of FIG. 10 is input. The multi-function device 80 will decrypt the combination data E(H(C)+H(D2), H(D1')) with the old password H(D1') stored in the password storage area 86b as a key. The combination data E(H(C)+H(D2), H(D1')) includes a plurality of block data 100, 102, and 104 (see FIG. 11C). The multi-function device 80 will individually decrypt each of the plurality of block data 100, 102, and 104. That is, the multifunction device 80 will decrypt the combination data E(H(C)+H(D2), H(D1')) in units of the blocks. As noted above, each of the block data 100, 102, and 104 is encrypted by the leading 16 bytes (first byte to sixteenth byte) of the old password H(D1'). Because of this, the multi-function device 80 will use the leading 16 bytes of the old password H(D1) stored in the password storage area 86b to decrypt each block data 100, 102, and 104.

The reproduction rule storage area 86c of the multi-function device 80 (see FIG. 8) stores the following data (rules for reproducing the challenge data and the new password).

(1) The eight bytes in the first half of the first block data 100 are challenge data (the first divided challenge data). The 8 bytes in the latter half are the new password (the first divided password data).

(2) The eight bytes in the first half of the second block data 102 are challenge data (the second divided challenge data). The 8 bytes in the latter half are the new password (the second divided password data).

(3) The four bytes from the leading portion of the third block data 104 are challenge data (the third divided challenge data). The next four bytes are dummy data. The next 4 bytes are the new password (the third divided password data). The last four bytes are dummy data.

(4) The challenge data H(C) can be reproduced when the challenge data of the first block data 100 is located at the leading portion, the challenge data of the second block data 102 follows thereafter, and the challenge data of the third block data 104 is last.

(5) The new password H(D2) can be reproduced when the new password of the first block data 100 is located at the leading portion, the new password of the second block data 102 follows thereafter, and the new password of the third block data 104 is last.

In the aforementioned process of S60 of FIG. 13, the challenge data and the new password will be reproduced in accordance with the aforementioned rules after the combination data (H(C)+H(D2), H(D1')) has been decrypted. The process of S60 corresponds to A11 of FIG. 9. Next, the multi-function device 80 will determine whether or not the challenge data decrypted in S60 is included in the challenge storage area 86a (see FIG. 8) (S62). In this way, the decrypted challenge data will be compared with the challenge data stored in the challenge storage area 86a in S58 of FIG. 12. The process of S62 corresponds to A12 of FIG. 9. In the case where the answer is YES in S62, the multi-function device 80 will delete the old password H(D1) stored in the password storage area 86b, and will store the new password H(D2) decrypted in S60 (S64). In this way, the old password H(D1) will be updated to the new password H(D2). The process of S64 corresponds to A13 of FIG. 9. In contrast, in the case where the answer in S62 is NO, the multi-function device 80 will skip S64. The multi-function device 80 will output the result of the password updating process to the management device 60 (S66). In the case where S66 is performed via S64, data indicating that the password updating process was successful will be output. In the case where S64 was skipped and S66 is performed, data indicating that the password updating process was not successful will be output. The management device 60 will display the result of the password updating process (see S40 of FIG. 10). The user can know whether or not the password updating was successful.

The management device 60 of the present embodiment will use the password H(D1') previously updated in the multi-function device 80 to encrypt the new password H(D2). The multi-function device 80 will decrypt the encrypted new password E(H(C)+H(D2), H(D1')) with the previously updated old password H(D1) as a key. In this way, the old password H(D1) will be updated to the new password H(D2). For example, in the event that a user is to update a password D2 with a new password D3, the new password H(D3) will be encrypted with the password H(D2') as a key. The multi-function device 80 will decrypt the encrypted new password E(H(C)+H(D3), H(D2')) with the password H(D2) as a key. In this way, the old password H(D2) will be updated with the new password H(D3).

According to the communication system 55 of the present embodiment, the old password that was previously input into the management device 60 by a user and updated in the multi-function device 80 will become a key in order to encrypt and decrypt the new password. Because of this, other than the password to be updated in the multi-function device 80, there will be no need to transmit an encryption key between the management device 60 and the multifunction device 80. The communication system 55 of the present embodiment achieves transmission of an encryption key in a novel way.

In the case where the encrypted combination data E(H(C)+H(D2), H(D1')) is sent from the management device 60 to the multi-function device 80, that combination data may be altered. In this case, the challenge data included in the combination data will not match the challenge data stored in the challenge storage 86a because the challenge data included in the combination data is changed. In this case, the password will not be updated. Updating to an altered password can be prevented. In particular, in the present embodiment, the challenge data will be included in all blocks 100, 102, and 104 (see FIG. 11B). Because of this, the password will not be updated, even if any of the blocks 100, 102, 104 are altered.

A user will input the old password D1' into the management device 60 when the password is to be updated. In the event that the old password D1' was not correctly input, the challenge data included in the decrypted combination data will not match the challenge data stored in the challenge storage area 86a because the encryption key and the decryption key do not match. In this case, the password will not be updated. According to the present embodiment, a password can be prevented from being updated in the event that the old password was not correctly input. In addition, in the present embodiment, hashed data of a fixed size will be used. In this case, it is anticipated that data communication between the two devices 60, 80, the process in which each device 60, 80 uses the data, and the like, can be easily performed.

Second Embodiment

In the aforementioned first embodiment, the combination data (H(C)+(D2)) was created from the hashed challenge data H(C) and the hashed new password H(D2). The data size of the hashed challenge data H(C) is the same as that of the hashed new password H(D2). Because of this, in the first embodiment, it is said that the data structure of the combination data can be simplified. In contrast, in each of the following embodiments, hashed data is not used. Because of this, there is a strong possibility that the data size of the challenge data is different than the data size of the new password. Each of the following embodiments will be described as one in which the data size of the challenge data is different than the data size of the new password.

The differences with the first embodiment will be listed below with reference to FIG. 9. The processes in FIG. 9 that are different in the first embodiment will have a dash affixed thereto and described.

(A1') The password storage area 86b (see FIG. 8) of the multi-function device 80 stores a password D1 that is not hashed.

(A5') The multi-function device 80 will produce challenge data (hereinafter expressed as "CD"), but will not hash the challenge data CD. The challenge storage area 86a of the multi-function device 80 (see FIG. 8) will store the unhashed challenge data CD.

(A7) The management device 60 will not hash the old password D1' that was input by a user.

(A8') The management device 60 will not hash the new password D2 that was input by a user.

(A9') The management device 60 will produce the combination data (CD+D2) from the unhashed challenge data CD and the unhashed new password D2. The combination data (CD+D2) will be encrypted in units of blocks by the unhashed old password D1'. The encrypted combination data will be expressed as E(CD+D2, D1').

Figure 14A:
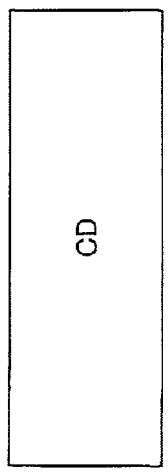
FIG. 14A shows an example of challenge data.
Figure 14B:
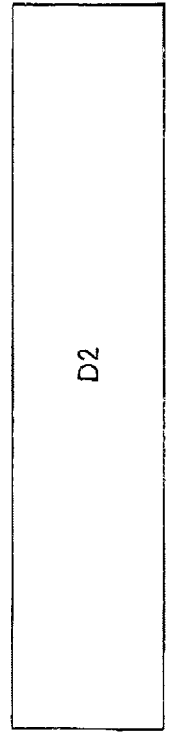
FIG. 14B shows an example of a new password
Figure 14C:
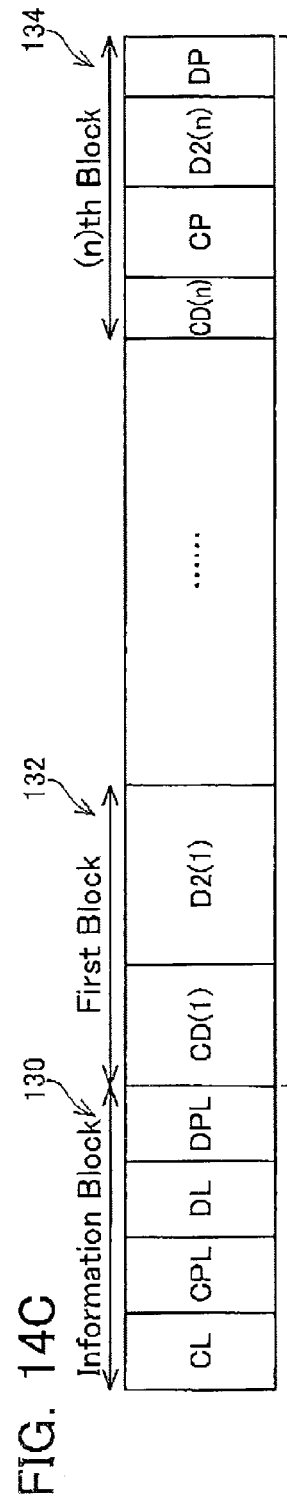
FIG. 14C shows an example of combination data (second embodiment).

The content of the process of the aforementioned A9' will be described in detail with reference to FIG. 14. FIG. 14A shows the challenge data CD. FIG. 14B shows the new password D2. The data size of the challenge data CD is different from that of the new password D2. FIG. 14C shows an information block 130 and combination data (CD+D2, D1'). The combination data (CD+D2, D1') includes n blocks 132, 134, etc. Each block other than the nth block 134 includes divided challenge data of data size CL and divided password data of data size DL. For example, the data size of the divided challenge data CD(1) included in block 132 is CL, and the data size of the divided password data D2(1) is DL. Only the divided challenge data and the divided password data are included in each block other than the nth block 134. In other words, dummy data is not included. The nth block 134 includes divided challenge data CD(n), challenge dummy data CP, divided password data D2(n), and password dummy data DP. The sum of CD(n) and CP is CL. The sum of D2(n) and DP is DL.

The data block 130 includes four types of data CL, CPL, DL, DPL. CL indicates the data size of the divided challenge data (e.g., the data size of CD(1)) included in one block. CPL indicates the data size of the challenge dummy data CP. DL indicates the data size of the divided password data (e.g., the data size of D2(1)) included in one block. DPL indicates the data size of the password dummy data DP. Each of the data block 130 and the n blocks 132, 134, etc. will be encrypted with the old password D1' as a key.

(A10') Successive data strings shown in FIG. 14C (the data blocks 130 and the combination data (CD+D2)) will be output to the multi-function device 80.

(A11') The multi-function device 80 will use the old password D1 stored in the password storage area 86b (see FIG. 8) to decrypt the encrypted data strings in each block. The multi-function device 80 will reproduce the challenge data CD and the new password D2 from the combination data (CD+D2). The reproduction rules storage area 86c of the multi-function device 80 stores the following reproduction rules.
(1) CL, CPL, DL, DPL will be understood by reading the data block 130.
(2) The data size of the divided challenge data included in each block from the first to (n−1)th is CL.
(3) The data size of the divided password data included in each block from the first to (n−1)th is DL.
(4) The data size of the divided challenge data CD(n) included in the nth block is a value equal to CL minus CPL.
(5) The data size of the divided password data D2(n) included in the nth block is a value equal to DL minus DPL.
(6) If the divided challenge data included in each block 132, 134, etc. are arranged in order, the challenge data CD can be reproduced.
(7) If the divided password data included in each block 132, 134, etc. are arranged in order, the new password data D2 can be reproduced.
(A12') The challenge data CD that was reproduced in the aforementioned A11' is not hashed. The multi-function device 80 will determine whether or not the reproduced challenge data CD matches the challenge data CD stored in the challenge storage area 86a.

(A13') The multi-function device 80 will update the password D1 stored in the password storage area 86b with the new password D2 that was reproduced in A11'.

In the present embodiment, the data size of the divided challenge data will be CL with respect to the (n−1) blocks. In addition, the sum of the data size of the divided challenge data CD(n) and the data size of the challenge dummy data CP is CL with respect to the nth block 134. It can be said that the data size for the challenge data CD in the n blocks (the sum of the divided challenge data and the challenge dummy data) is fixed. Likewise, it can be said that the data size for the new password D2 in the n blocks (the sum of the divided password data and the password dummy data) is fixed. In the present embodiment, each block of the combination data can be placed into an orderly data structure even in the event the data size of the challenge data CD is different than the data size of the new password D2. In this case, the management device 60 will easily create the combination data. In addition, the multi-function device 80 will be able to easily reproduce the challenge data CD and the new password D2.

Note that the aforementioned data block 130 may include data indicating the total data size of the challenge data CD instead of the CPL. In addition, the data block 130 may include data indicating the total data size of the new password D2 instead of the DPL.

Third Embodiment

Figure 15:
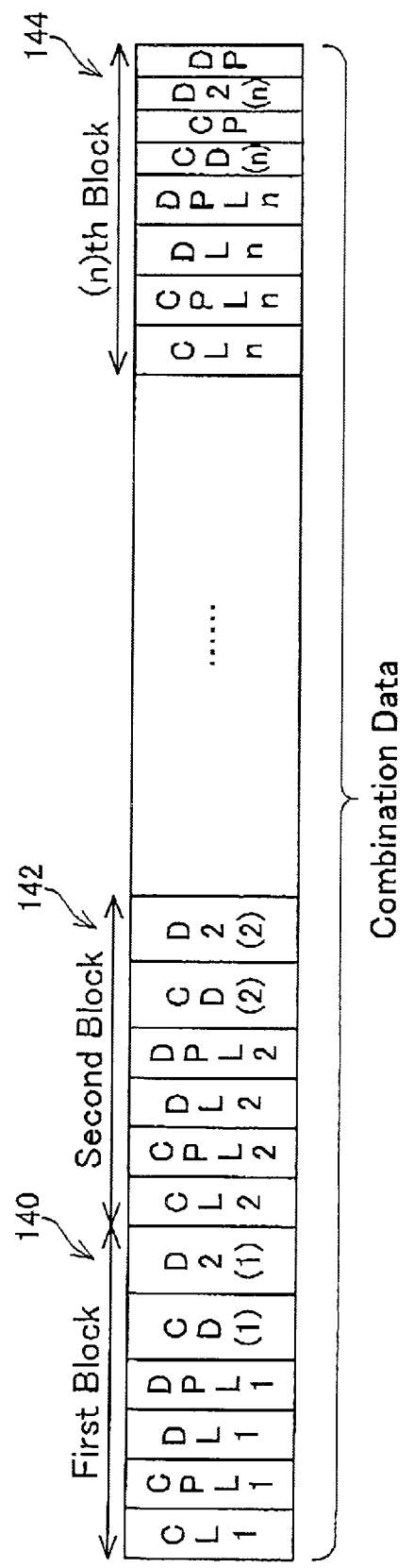
FIG. 15 shows an example of combination data (third embodiment).

In the present embodiment, the data structure of the combination data (CD+D2) is different than that of the second embodiment. FIG. 15 shows combination data (CD+D2) of the present embodiment. In the present embodiment, the combination data (CD+D2) is encrypted by the n blocks 140, 142, 144, etc. The data size of the divided challenge data (e.g., CD(1)) is different than the data size of the divided password data (e.g., D2(1)) in each block. Each block 140, 142, 144, etc. includes four types of information data, in addition to the divided challenge data and the divided password data. For example, the first block 140 includes CL1, CPL1, DL1, and DPL1. CL1 indicates the data size of the divided challenge data CD(1) included in the first block 140. CPL1 indicates the data size of the challenge dummy data included in the first block 140. DL1 indicates the data size of the divided password data D2(1) included in the first block 140. DPL1 indicates the data size of the password dummy data included in the first block 140. Note that CPL1 and DPL1 are data indicating a data size of zero because the challenge dummy data and the password dummy data are not included in the first block 140. The other blocks 142, 144, etc. also have data structures that are identical to that of the block 140.

The multi-function device 80 can reproduce the challenge data CD and the password D2 based upon the information data (CL, CPL, DL, DPL) included in each block. In the present embodiment, only the last block 144 includes dummy data CP, DP. The other blocks 140, 142, etc. include data (e.g., CPL1, DPL1, etc.) indicating the data size of dummy data (i.e., zero), despite not including dummy data. When done in this way, the same type of information data (CL, CPL, DL, DPL) can be included in all blocks. In this case, the multi-function device 80 can reproduce the challenge data CD and the new password D2 by reading each block 140, 144, etc. in the same order. The multi-function device 80 will be expected to easily reproduce each data.

Note that in the present embodiment, only the last block 144 includes the dummy data CP, DP. However, the dummy data CP, DP may also be included in other blocks 142, 144, etc. In addition, the blocks that do not include dummy data may not include CPL and DPL.

Fourth Embodiment

Figure 16:
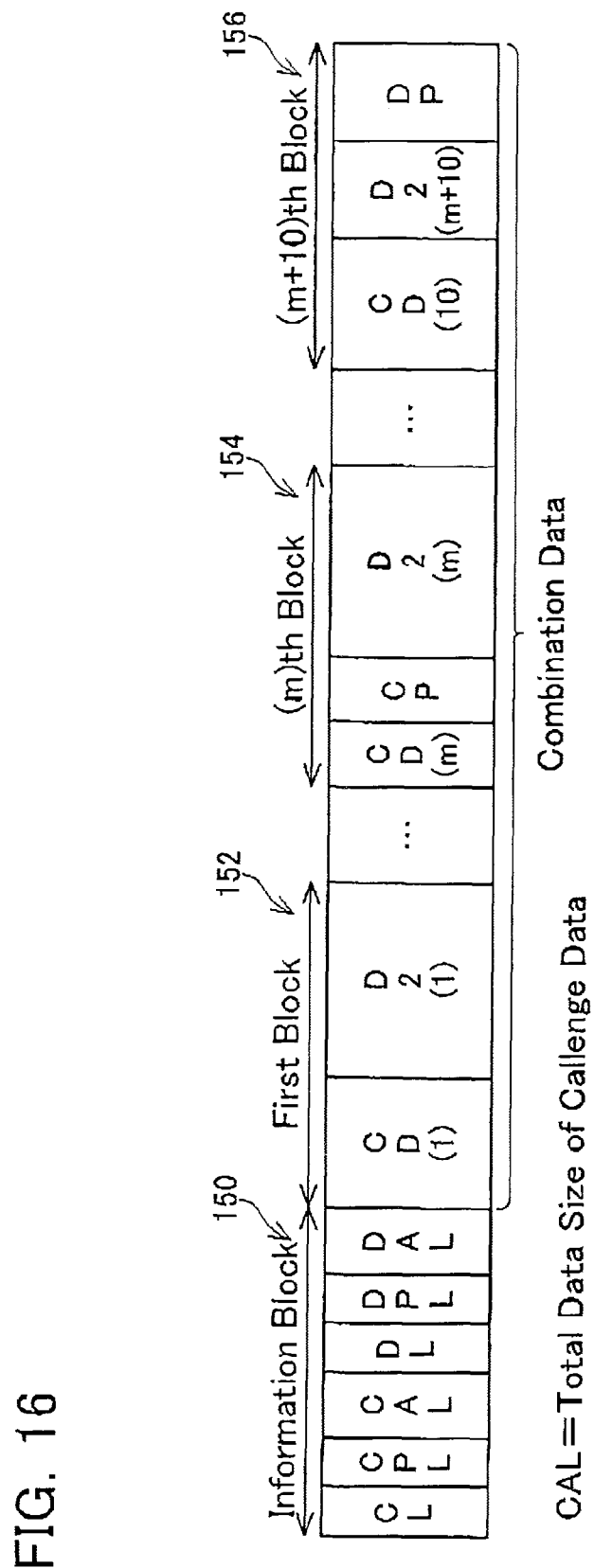
FIG. 16 shows an example of combination data (fourth embodiment).

FIG. 16 shows combination data (CD+D2) of the present embodiment. In the present embodiment, the combination data (CD+D2) is encrypted by (m+10) blocks 152, 154, 156, etc. Like in the second embodiment, the information block 150 is produced in this embodiment. The information block 150 includes the four types of data described in the second embodiment (CL, CPL, DP, DPL), as well as CAL and DAL. CAL is data indicating the total data size of the challenge data CD. DAL is data indicating the total data size of the new password D2. The data size of the divided challenge data included in each block from the first to (m−1)th is fixed (i.e., CL). The data size of the mth divided challenge data CD(m) is not CL. The sum of the data size of CD(m) and the data size of the challenge dummy data CP is CL. The data size of the divided challenge data included in each block from the (m+1)th to (m+10)th is fixed (i.e., CL). The data size of the divided password data included in each block from the first to (m+9)th is fixed (i.e., DL). The data size of the (m+10)th divided password data D2(m+10) is not DL. The sum of D2(m+10) and the password dummy data DP is DL.

In the present embodiment, the new password D2 is divided into (m+10) divided password data. One block includes one divided password data. In order to reproduce the new password D2, the first to (m+10)th blocks are needed. In contrast, the challenge data CD is divided into m divided challenge data. Thus, the challenge data CD can be reproduced from the divided challenge data included in the first to mth blocks. The divided challenge data included in the first to tenth blocks is also included in the (m+1)th to (m+10)th. For example, CD(1) is included in the (m+1)th. In addition, for example, CD(10) is included in the (m+10)th.

The multi-function device 80 can reproduce the challenge data CD from CL, CPL, and CAL included in the information block S50. The multi-function device 80 will reproduce the challenge data CD from the divided challenge data included in the first to mth blocks. The challenge data CD will be compared to the challenge data CD stored in the challenge data storage area 86*a* (see FIG. 8). In addition, the multi-function device 80 will reproduce one portion of the challenge data CD from the divided challenge data included in the (m+1)th to the (m+10)th blocks. The multi-function device 80 will compare whether or not the reproduced portion is included in a portion of the challenge data CD stored in the challenge storage area 86*a*.

In addition, the multi-function device 80 can reproduce the new password D2 from DP, DPL, and DAL included in the information block 150. The multi-function device 80 will reproduce the new password D2 from the divided password data included in the first to m+10th blocks.

Note that if in fact at least CL and CAL are present, the challenge data CD can be reproduced. In other words, the challenge data CD can be reproduced even if the information indicating the data size CPL of the challenge dummy data CP is not included in the block 150. In addition, if at least DL and DAL are present, the new password D2 can be reproduced. In other words, the new password D2 can be reproduced even if the information indicating the data size DPL of the password dummy data DP is not included in the block 150. The information block 150 need not include CPL and DPL.

Fifth Embodiment

Figure 17:
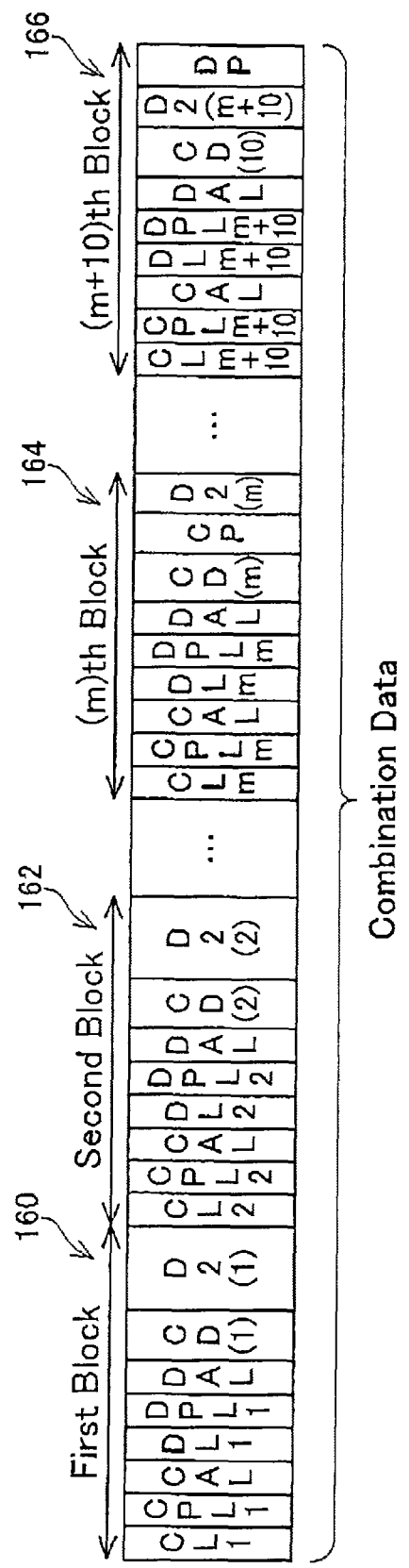
FIG. 17 shows an example of combination data (fifth embodiment).

FIG. 17 shows combination data (CD+D2) of the present embodiment. In the present embodiment, the combination data (CD+D2) is encrypted by (m+10) blocks 160, 162, 164, 166, etc. The data size of the divided challenge data (e.g., CD(1)) is different than the data size of the divided password data (e.g., D2(1)) in each block. This point is the same as the third embodiment. Six types of information data (CL, CPL, CAL, DL, DPL, DAL) are included in each block 160, 162, 164, 166, etc. The content of the information data is the same as in the third and fourth embodiments. In the present embodiment, the new password D2 is divided into (m+10) divided password data. In order to reproduce the new password D2, the first to (m+10)th blocks are needed. In contrast, the challenge data CD is divided into m divided challenge data. Thus, the challenge data CD can be reproduced from the divided challenge data included in the first to mth blocks. The divided challenge data included in the first to tenth blocks is included from the (m+1)th to (m+10)th. This point is the same as the fourth embodiment.

The multi-function device 80 can reproduce the challenge data CD from CL, CPL, and CAL included in each block. The multi-function device 80 will reproduce the challenge data CD from the divided challenge data included in the first to mth blocks. In addition, the multi-function device 80 can reproduce the new password D2 from DP, DPL, and DAL included in each block. The multi-function device 80 will reproduce the new password D2 from the divided password data included in the first to m+10th blocks. According to the data structure of the present embodiment, the multi-function device 80 can reproduce the challenge data CD and the new password D2.

Figure 3:
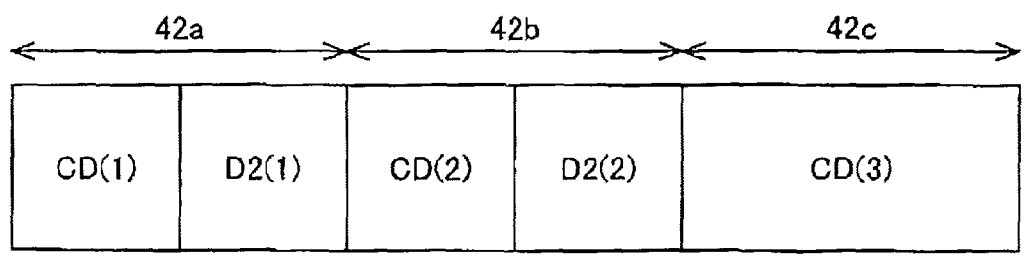
FIG. 3 shows an example of combination data.

Some of the characteristics of the technology disclosed in the above embodiments will be described with reference to Figures. FIG. 3 shows another example of the combination data (CD+D2). In the example of FIG. 3, three blocks 42*a*, 42*b*, and 42*c* are used to encrypt the combination data. The encryption device 16 may divide the challenge data CD input to the challenge input device 14 into at least two divided challenge data. The encryption device 16 may create combination data such that at least a part of the predetermined data D2 is located between one of the divided challenge data and the other divided challenge data. In the example of FIG. 3, a part D2(1) of the predetermined data D2 is arranged between the two divided challenge data CD(1), CD(2). In the example of FIG. 3, a part D2(2) of the predetermined data D2 is located between the two divided challenge data CD(1), CD(2).

As shown in FIG. 3, the encryption device 16 may also create the combination data (CD+D2) such that each of all the blocks 42*a*, 42*b*, and 42*c* of the combination data (CD+D2) includes at least one divided challenge data. In this case, the information processing device 25 can know that the combination data has been altered, even if any of the blocks 42*a*, 42*b*, and 42*c* have been altered.

Figure 4:
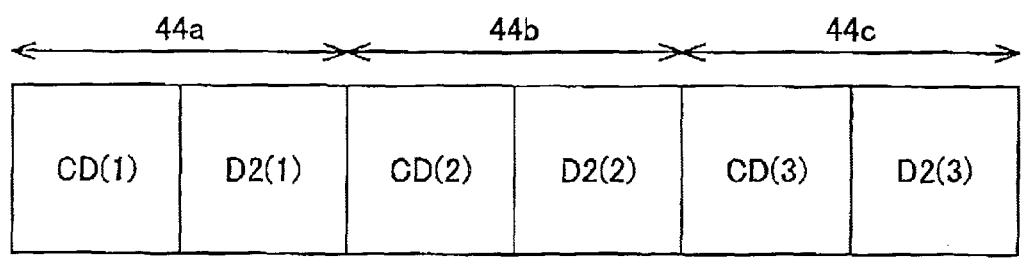
FIG. 4 shows an example of combination data.

FIG. 4 shows another example of the combination data (CD+D2). In the example of FIG. 4, three blocks 44*a*, 44*b*, and 44*c* are used to encrypt the combination data. The encryption device may divide the predetermined data D2 into at least two divided predetermined data D2(1), D2(2), D2(3). The encryption device 16 may create the combination data (CD+D2) such that each of all the blocks 44*a*, 44*b*, and 44*c* of the combination data (CD+D2) includes both at least one divided challenge data and at least one divided predetermined data.

Figure 1:
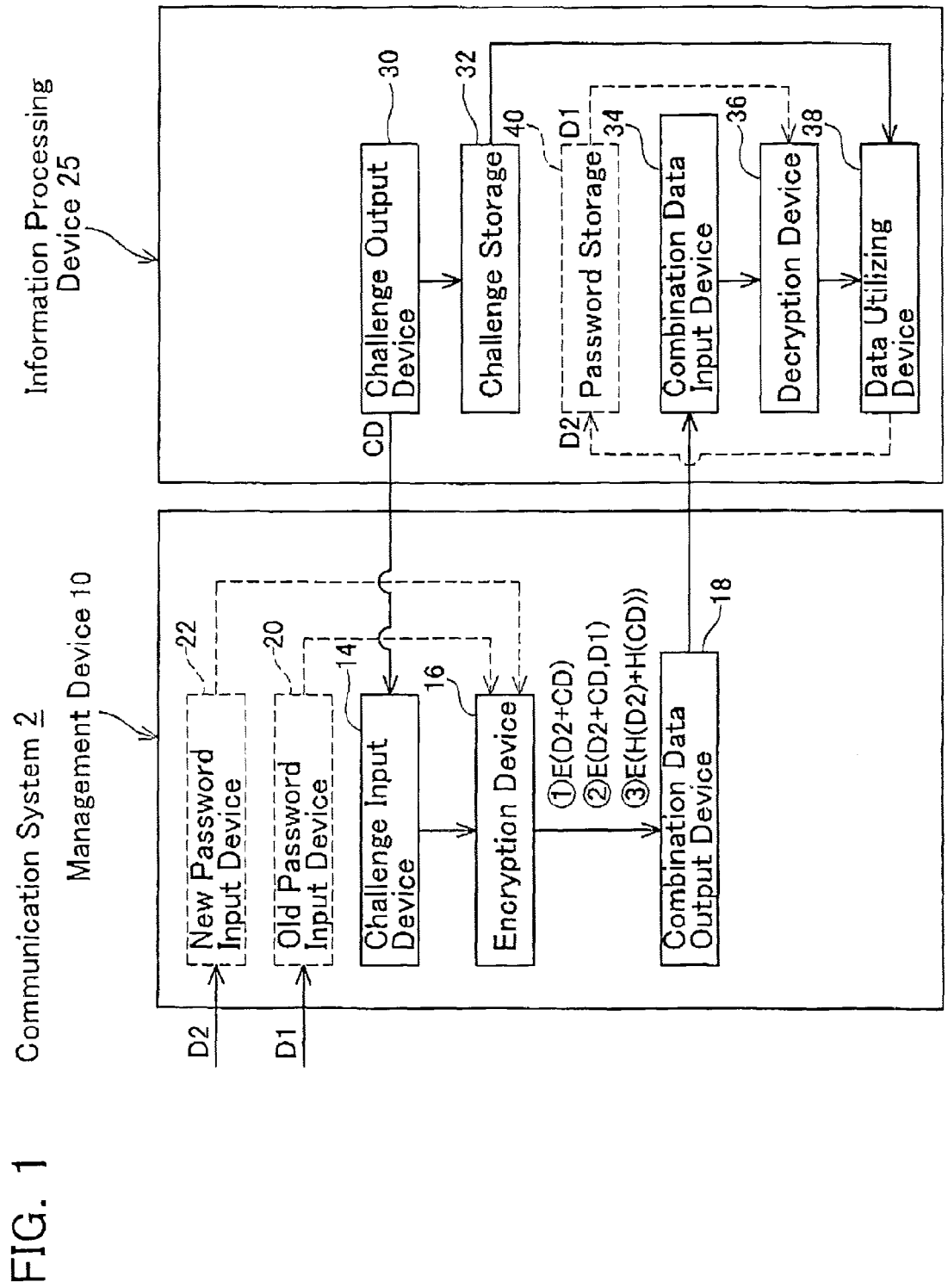
FIG. 1 shows an example of a communication system.
Figure 2:
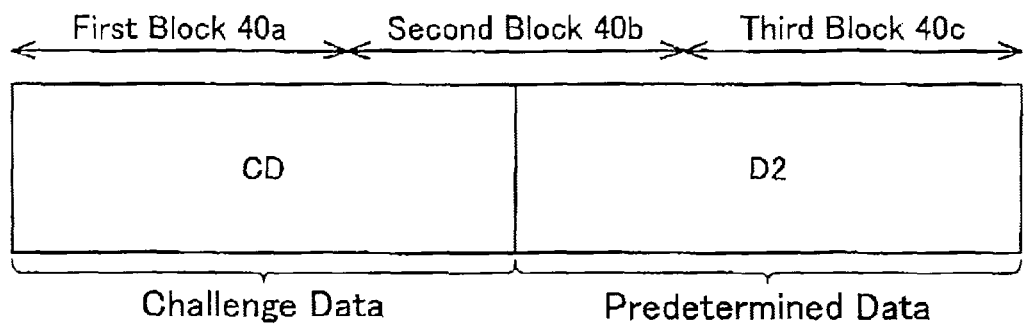
FIG. 2 shows an example of combination data.

The communication system 2 may be used in a system in which the information processing device 25 updates a password in response to a command from the management device 10. The construction of this system will be described with reference to FIG. 1. The management device 10 may update an old password D1 stored in the information processing device 25 by outputting a new password (also expressed with the reference numeral "D2") to the information processing device 25.

The management device 10 may have an old password input device 20 that inputs the old password D1, and a new password input device 22 that inputs the new password D2. The aforementioned predetermined data D2 may be the new password. The old password D1 may have been previously input into the management device 10 by a user, and stored in the information processing device 25. A user of the management device 10 may store the old password D1. The user can input the old password D1 that he or she has stored into the management device 10 in the event that the old password D1 stored in the information processing device 25 is to be updated to the new password D2. On the other hand, the management device 10 may continuously swore the old password D1 that was previously input by the user. In this case, the user may not need to input the old password D1 into the management device 10 in the event that the old password D1 is to be updated to the new password D2. Note that the old password input device 20 and the first new password input device 22 may be constructed to be separate from each other, or may be constructed to be integral with each other. The encryption device 16 may encrypt the combination data (CD+D2) by utilizing the old password D1 that was input to the old password input device 20 as a key. The combination data that was encrypted with D1 as a key will hereinafter be expressed as E(CD+D2, D1).

The information processing device 25 may have a password storage 40 that stores the old password D1. The old password D1 may be a password that was previously input to the management device 10 by a user. The decryption device 36 may decrypt the encrypted combination data E(CD+D2, D1) by utilizing the old password D1 stored in the password storage 30 as a key. The data utilizing device 38 may compare the challenge data CD included in the combination data (CD+D2) decrypted by the decryption device 36 and the challenge data CD stored in the challenge storage 32. In the case where both challenge data are identical, the data utilizing device 38 may update the old password D1 stored in the old password storage 30 to the new password D2 included in the combination data (CD+D2) decrypted by the decryption device 36. The data utilizing device 38 may be prohibited from updating the old password D1 in the case where both challenge data are not identical.

Hashed data may also be used in the communication system 2. If the data is hashed, the size of data can be made constant. In this case, it is anticipated that data communication between devices, the process in which each device uses the data, and the like can be easily performed. In the case where hashed data is to be used, the management device 10 and the information processing device 25 may operate as follows.

The challenge output device 30 may create hashed challenge data (hereinafter expressed as H(CD)), and output the hashed challenge data H(CD) to the management device 10. The challenge storage 32 may store the hashed challenge data H(CD) that was output by the challenge output device 30. The challenge input device 14 may input the hashed challenge data H(CD) that was output by the information processing device 25. The encryption device 16 may also hashed predetermined data (hereinafter expressed as H(D2)) by hashing the predetermined data D2, and create combination data (H(CD)+H(D2)) from the hashed predetermined data H(D2) and the hashed challenge data H(CD) that was input to the challenge input device 14. Note that in FIG. 1, the encrypted combination data (H(CD)+H(D2)) is expressed as E(H(CD)+H(D2), H(D2)). The data utilizing device 38 may compare the hashed challenge data H(CD) included in the combination data (H(CD)+H(D2)) decrypted by the decryption device 36 and the hashed challenge data H(CD) stored in the challenge storage 32. In a case where both hashed challenge data are identical, the data utilizing device 38 may use the hashed predetermined data H(D2) included in the combination data (H(CD)+H(D2)) that was decrypted by the decryption device 36. In a case where both hashed challenge data are not identical, the data utilizing device 38 may be prohibited from utilizing the hashed predetermined data H(D2) included in the combination data (H(CD)+H(D2)).

The encryption device 16 may divide the hashed challenge data H(CD) into at least two divided hashed challenge data. The encryption device 16 may divide the hashed predetermined data H(D2) into at least two divided hashed predetermined data. The encryption device 16 may create the combination data (H(CD)+H(D2)) such that each of all the blocks of the combination data (H(CD)+H(D2)) includes both at least one divided hashed challenge data and at least one divided hashed predetermined data.

In this case, the encryption device 16 may create the combination data (H(CD)+H(D2)) such that with respect to each of all the blocks of the combination data E(H(CD)+H(D2)), the data size of the divided hashed predetermined data is identical to the data size of the divided hashed challenge data When done in this way, the construction of the combination data can be simplified. It can be anticipated that the process for creating and encrypting the combination data will become simple. It can be anticipated that the process for decrypting the combination data and reproducing the challenge data and the predetermined data will become simple.

Figure 5:
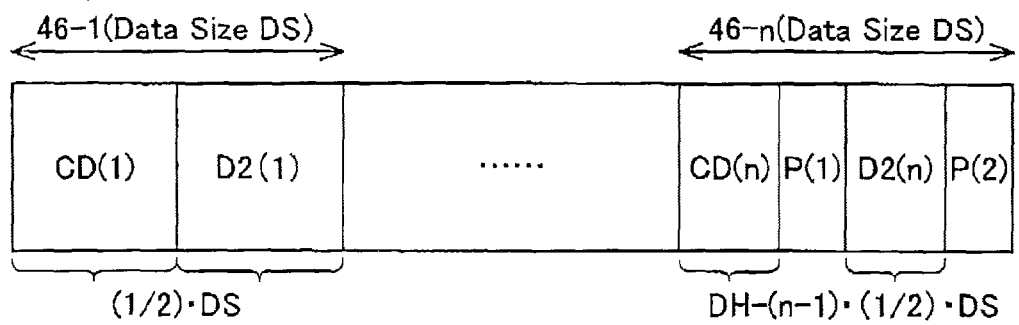
FIG. 5 shows an example of combination data.

FIG. 5 shows another example of the combination data (H(CD)+H(D2)). In the example of FIG. 5, n blocks 46-1 to 46-$n$ are used to encrypt the combination data. Here, the unit data size that will be the encryption unit is DS, the number of blocks of the combination data is n (n is an integer greater than 1), and the data size of the hashed challenge data H(CD) and the data size of the hashed predetermined data are each DH. In this case, the encryption device 16 may create the combination data such that, with respect to each of the (n−1) blocks, the data size of the divided hashed challenge data (e.g., CD(1)) is (½)×DS, and the data size of the divided hashed predetermined data (e.g., D2(1)) is (½)×DS. In addition, the encryption device 16 may create the combination data such that, with respect to the remaining one block (46-$n$ in the example of FIG. 5)) the data size of the divided hashed challenge data is (DH−(n−1)×(½)×DS), and the data size of the divided hashed predetermined data is (DH−(n−1)×(½)×DS). The encryption device 16 may include dummy data P(1), P(2) in order to make the data size of the remaining one block 46-$n$ be DS. This construction is effective in cases in which the data size of the hashed data H(D2), H(CD) is not an integral multiple of the unit data size DS.

Figure 6A:
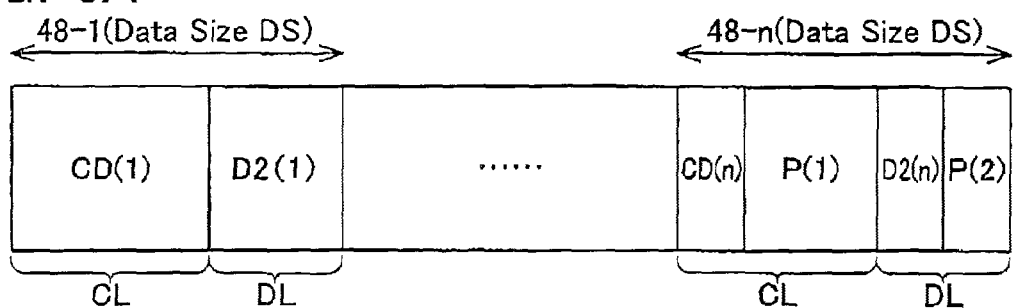
FIG. 6A shows an example of combination data.

FIG. 6A shows another example of the combination data (CD+D2). In the example of FIG. 6A, n blocks 48-1 to 48-$n$ are used to encrypt the combination data. In this example, the challenge data CD and the predetermined data D2 are not hashed. Here, the unit data size is DS, the number of blocks of the combination data is n (n is an integer greater than 1), the data size of the challenge data CD is CAL, and the data size of the predetermined data is DAL. CAL and DAL have different data sizes. In this case, the encryption device 16 can create the combination data such that with respect to each of the (n−1) blocks, the data size of the divided challenge data is CL, the data size of the divided predetermined data is DL, and the total data size of CL and DL is DS. For example, CD(1) that is included in block 48-1 is CL, and D2(1) is DL. The encryption device 16 may create the combination data such that, with respect to the remaining one block (48-n in the example of FIG. 6A), the data size of the divided challenge data CD(n) is (CAL−(n−1)×CL), and the data size of the divided predetermined data D2(n) is (DAL−(n−1)×DL). In this case, the aforementioned remaining one block may include first dummy data such that the total data size of the divided challenge data of the remaining one block and the first dummy data is CL. The remaining one block may also include second dummy data such that the total data size of the divided predetermined data of the remaining one block and the second dummy data is DL.

Figure 6B:
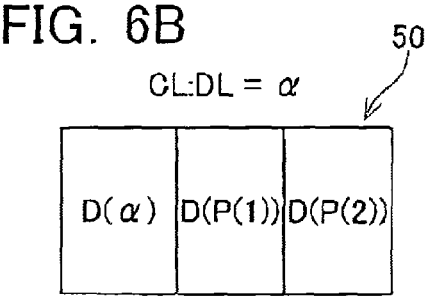
FIG. 6B shows an example of data indicating the data size.

The combination data output device 18 may output data illustrated in FIG. 6B to the information processing device 25 in the case where the construction illustrated in FIG. 6A is used. In other words, the combination data output device 18 may output data (D(α)) indicating the ratio between CL and DL, data D(P(1)) indicating the data size of the first dummy data P(1), and data D(P)) indicating the data size of the second dummy data P(2). Note that these information data (D(α) etc.) may be output to the information processing device 25 separate from the combination data. The aforementioned statement "separate from the combination data" means that the aforementioned information data is not included in each block 48-1 to 48-n. Note that this statement does not exclude outputting the information data and the combination data as successive data strings.

In addition, as shown in FIG. 6B, the aforementioned information data may be encrypted as one block 50. Furthermore, D(α) may be split into data that indicates the data size of the divided predetermined data included in the one block, and the data size of the divided challenge data included in the one block. The information processing device 25 may reproduce the challenge data CD and the predetermined data D2 from the combination data (CD+D2) based upon the aforementioned information data. According to this construction, the information processing device 25 can reproduce the challenge data CD and the predetermined data D2 even in the case where the total data size of the challenge data CD is different from the total data size of the predetermined data D2.

Note that the combination data output device 18 may output data indicating the total data size CAL of the challenge data CD and the total data size DAL of the predetermined data D2 instead of D(P1) and D(P2) of the aforementioned information data. In this case as well, the information processing device 25 can reproduce the challenge data CD and the predetermined data D2.

Figure 7:
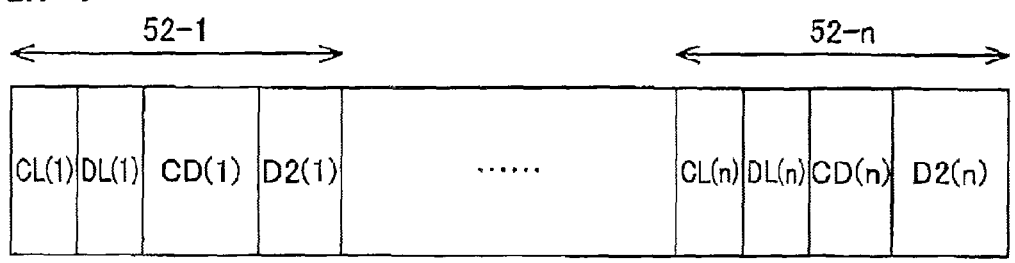
FIG. 7 shows an example of combination data.

FIG. 7 shows another example of the combination data (CD+D2). In the example of FIG. 7, n blocks 52-1 to 52-n are used to encrypt the combination data. Here, the total data size of the challenge data CD is different than the total data size of the predetermined data D2. In this case, the encryption device 16 may create the combination data (CD+D2) such that each of all the blocks 52-1 to 52-n of the combination data (CD+D2) includes data (e.g., CL(1)) indicating the data size of the divided challenge data (e.g., CD(1)) included in that block (e.g., 52-1), and data (e.g., DL(1)) indicating the data size of the divided predetermined data (e.g., D2(1)) included that block (e.g., 52-1). In this case, the information processing device 25 can know the data size of the divided challenge data CD(1) to CD(n) included in each block by reading CL(1) to CL(n). Because of this, the challenge data from each block can be reproduced. The information processing device 25 can know the data size of the divided challenge data D2(1) to D2(n) included in each block by reading DL(1) to DL(n). Because of this, the predetermined data D2 from each block can be reproduced.

In addition, the encryption device 16 may include dummy data and data indicating the data size of the dummy data in at least one block of the combination data (CD+D2). In this case, the information processing device 25 can know that the dummy data is included. The information processing device 25 can know the data size of the dummy data.

In the case where the total data size of the challenge data CD is different from the total data size of the predetermined data D2, the combination data output device 18 may output data indicating the total data size of the challenge data CD, and data indicating the total data size of the predetermined data D2, to the information processing device 25. The information processing device 25 can know the total data size of the challenge data CD and the total data size of the predetermined data D2. The information processing device 25 can reproduce the challenge data CD and the predetermined data D2 from these data. Note that the data indicating the total data size may be included in the combination data (e.g., may be included in the blocks), or may be output separately from the combination data.

In the case where the total data size of the predetermined data D2 is greater than the total data size of the challenge data CD, the encryption device 16 may create the combination data (CD+D2) such that at least two blocks of the combination data (CD+D2) includes the same divided predetermined data. In addition, in the case where the total data size of the challenge data CD is greater than the total data size of the predetermined data D2, the encryption device 16 may create the combination data (CD+D2) such that at least two blocks of the combination data (CD+D2) includes the same challenge data. This construction can be effectively utilized when the total data size of the predetermined data D2 is different than the total data size of the challenge data CD.

The management device may be a computer CC) that is to be connected to the Internet.

The information processing device may be a multi-function device that is to be connected to the Internet. The multi-function device may have at least a scanning device and a printing device. The multi-function device may function as an internet facsimile device.

The information processing device may store a login password. The management device may output a password that was input by a user to the information processing device. The information processing device may input the password that was output by the management device. The information processing device may compare the inputted password with the login password stored therein, and perform a process in response to a command from the management device in the case where both passwords match.

The information processing device may be communicably connected with a plurality of management devices. The information processing device may be shared by the plurality of management devices. The information processing device may store a login password with respect to each management device.

The information processing device may store rules for reproducing the challenge data and the new data from the decrypted combination data.

Specific examples were described in detail above, however these are simply illustrations, and do not limit the scope of the claims. The specific examples illustrated above include various modifications and changes that are within the technology disclosed in the present specification.

For example, unique IDs can be allocated to CPL, DPL that indicate the data size of the dummy data. In the event that these IDs are included in the blocks, the multi-function device 80 will reproduce the data as dummy data of a predetermined data size is included in the blocks. In addition, in the event that these IDs are not included in the blocks, the multi-function device 80 will assume that the dummy data is not included in the blocks.

In addition, the technological components described in the present specification or the drawings exhibit technological utility individually or in various combinations, and are not limited to the combinations disclosed in the claims at the time of application. Furthermore, the technology illustrated in the present specification or the drawings simultaneously may achieve a plurality of objects, and has technological utility by achieving one of these objects.

What is claimed is:

1. A communication system, comprising:
   an information processing device; and
   a management device capable of outputting predetermined data to the information processing device,
   wherein the management device comprises:
      a first processor; and
      a first storage memory storing instructions for causing the processor to function as:
         a challenge input device that inputs challenge data output by the information processing device, the challenge data being different from the predetermined data;
         an encryption device that divides the challenge data into at least two divided challenge data, divides the predetermined data into at least two divided predetermined data, creates combination data including the challenge data and the predetermined data which is different from the challenge data, and encrypts the combination data in units of blocks, each block having a unit data size, wherein the encryption device creates the combination data such that at least a part of the predetermined data is located between one divided challenge data and an other divided challenge data, and each of all the blocks of the combination data includes both at least one divided challenge data and at least one divided predetermined data,
         wherein, in a case where the unit data size is DS, the number of the blocks of the combination data is n (n is an integer more than 1), the data size of the challenge data is CAL, the data size of the predetermined data is DAL, and CAL is different from DAL,
         wherein, with respect to each of the (n−1) blocks, the data size of the divided challenge data is CL, the data size of the divided predetermined data is DL, and the total data size of CL and DL is DS,
         wherein, with respect to the remaining one block, the data size of the divided challenge data is (CAL−(n−1)×CL), and the data size of the divided predetermined data is (DAL−(n−1)×DL),
         wherein the remaining one block includes first dummy data such that the total data size of the divided challenge data of the remaining one block and the first dummy data is to be CL, and
         wherein the remaining one block includes second dummy data such that the total data size of the divided predetermined data of the remaining one block and the second dummy data is to be DL; and
         a combination data output device that outputs the combination data encrypted by the encryption device to the information processing device,
   wherein the information processing device comprises:
      a second processor; and
      a second storage memory storing instructions for causing the processor to function as:
         a challenge output device that outputs the challenge data to the management device;
         a challenge storage that stores the challenge data output by the challenge output device;
         a combination data input device that inputs the encrypted combination data output by the management device;
         a decryption device that decrypts the encrypted combination data input to the combination data input device in units of the blocks; and
         a data utilizing device that compares the challenge data included in the combination data decrypted by the decryption device and the challenge data stored in the challenge storage, utilizes the predetermined data included in the combination data decrypted by the decryption device in a case where both challenge data are identical, and is prohibited from utilizing the predetermined data included in the combination data in a case where both challenge data are not identical.

2. The communication system as in claim 1, wherein
the combination data output device outputs, to the information processing device, data indicating a ratio of CL and DL, data indicating the data size of the first dummy data, and data indicating the data size of the second dummy data.

3. The communication system as in claim 1, wherein
the management device is capable of updating an old password stored in the information processing device by outputting a new password to the information processing device,
the management device further comprises an old password input device that inputs the old password, and a new password input device that inputs the new password,
the predetermined data is the new password,
the encryption device encrypts the combination data by utilizing the old password input to the old password input device as a key,
the information processing device further comprises a password storage that stores the old password,
the decryption device decrypts the encrypt combination data by utilizing the old password stored in the password storage as a key, and
the data utilizing device compares the challenge data included in the combination data decrypted by the decryption device and the challenge data stored in the challenge storage, updates the old password stored in the password storage to the new password included in the combination data decrypted by the decryption device in the case where both challenge data are identical, and is prohibited from updating the old password in the case where both challenge data are not identical.

4. The communication system as in claim 1, wherein
in a case where the data size of the challenge data is different from the data size of the predetermined data, the combination data output device outputs, to the information processing device, data indicating the data size of the challenge data, and data indicating the data size of the predetermined data.

5. A management device to be connected with an information processing device in a communicable manner, the management device capable of outputting predetermined data to the information processing device, the management device comprising:
 a processor; and
 a storage memory storing instructions for causing the processor to function as:
  a challenge input device that inputs challenge data output by the information processing device, the challenge data being different from the predetermined data;
  an encryption device that divides the challenge data into at least two divided challenge data, divides the predetermined data into at least two divided predetermined data, creates combination data including the challenge data and the predetermined data which is different from the challenge data, and encrypts the combination data in units of blocks, each block having a unit data size, wherein the encryption device creates the combination data such that at least a part of the predetermined data is located between one divided challenge data and an other divided challenge data, and each of all the blocks of the combination data includes both at least one divided challenge data and at least one divided predetermined data,
  wherein, in a case where the unit data size is DS, the number of the blocks of the combination data is n (n is an integer more than 1), the data size of the challenge data is CAL, the data size of the predetermined data is DAL, and CAL is different from DAL,
  wherein, with respect to each of the (n−1) blocks, the data size of the divided challenge data is CL, the data size of the divided predetermined data is DL, and the total data size of CL and DL is DS,
  wherein, with respect to the remaining one block, the data size of the divided challenge data is (CAL−(n−1)×CL), and the data size of the divided predetermined data is (DAL−(n−1)×DL),
  wherein the remaining one block includes first dummy data such that the total data size of the divided challenge data of the remaining one block and the first dummy data is to be CL, and
  wherein the remaining one block includes second dummy data such that the total data size of the divided predetermined data of the remaining one block and the second dummy data is to be DL; and
  a combination data output device that outputs the combination data encrypted by the encryption device to the information processing device.

6. A non-transitory computer readable medium for a management device, the management device capable of outputting predetermined data to an information processing device, the non-transitory computer readable medium including instructions for ordering a computer mounted on the management device to perform:
 dividing the challenge data into at least two divided challenge data, dividing the predetermined data into at least two divided predetermined data, creating combination data including the predetermined data and challenge data obtained from the information processing device, the challenge data being different from the predetermined data, and encrypts the combination data in units of blocks, each block having a unit data size, wherein at least a part of the predetermined data is located between one divided challenge data and an other divided challenge data, and each of all the blocks of the combination data includes both at least one divided challenge data and at least one divided predetermined data,
 wherein, in a case where the unit data size is DS, the number of the blocks of the combination data is n (n is an integer more than 1), the data size of the challenge data is CAL, the data size of the predetermined data is DAL, and CAL is different from DAL,
 wherein, with respect to each of the (n−1) blocks, the data size of the divided challenge data is CL, the data size of the divided predetermined data is DL, and the total data size of CL and DL is DS,
 wherein, with respect to the remaining one block, the data size of the divided challenge data is (CAL−(n−1)×CL), and the data size of the divided predetermined data is (DAL−(n−1)×DL),
 wherein the remaining one block includes first dummy data such that the total data size of the divided challenge data of the remaining one block and the first dummy data is to be CL, and
 wherein the remaining one block includes second dummy data such that the total data size of the divided predetermined data of the remaining one block and the second dummy data is to be DL; and
 outputting the encrypted combination data to the information processing device.

7. The non-transitory computer readable medium as in claim 6, wherein
 the creating step is performed by creating hashed predetermined data by hashing the predetermined data, and creating the combination data from the hashed predetermined data and hashed challenge data obtained from the information processing device.

8. The non-transitory computer readable medium as in claim 6, wherein
 in a case where the data size of the challenge data is different from the data size of the predetermined data, the outputting step is performed by outputting the encrypted combination data, data indicating the data size of the challenge data, and data indicating the data size of the predetermined data.

9. A communication system, comprising:
 an information processing device; and
 a management device capable of outputting predetermined data to the information processing device,
 wherein the management device comprises:
  a first processor; and
  a first storage memory storing instructions for causing the processor to function as:
   a challenge input device that inputs hashed challenge data output by the information processing device, the hashed challenge data being created from challenge data by the information processing device, and the challenge data being different from the predetermined data;
   an encryption device that creates hashed predetermined data by hashing the predetermined data, divides the hashed challenge data into at least two divided hashed challenge data, divides the hashed predetermined data into at least two divided hashed predetermined data, creates combination data including the hashed challenge data and the hashed predetermined data which is different from the challenge data, and encrypts the combination data in units of blocks, each block having a unit data size, wherein the encryption device creates the combination data such that each of all the blocks of the combination data includes both at least one divided hashed challenge data and at least one divided hashed predetermined data, and, with respect to each of all the blocks, the data size of the divided hashed challenge data is identical to the data size of the divided hashed predetermined data, wherein, in a case where the unit data size is DS, the number of the blocks of the combination data is n (n is an integer more than 1), the data size of the hashed challenge data is DH, and the data size of the hashed predetermined data is DH, wherein, with respect to each of the (n−1) blocks, the data size of the divided hashed challenge data is (½)×DS, and the data size of the divided hashed predetermined data is (½)×DS, wherein, with respect to the remaining one block, the data size of the divided hashed challenge data is (DH−(n−1)×(½)×DS), and the data size of the divided hashed predetermined data is (DH−(n−1)×(½)×DS), and wherein the remaining one block includes dummy data such that the data size of the remaining one block is to be DS; and a combination data output device that outputs the combination data encrypted by the encryption device to the information processing device, wherein the information processing device comprises:
a second processor; and
a second storage memory storing instructions for causing the processor to function as:
a challenge output device that creates the hashed challenge data by hashing the challenge data and outputs the challenge data to the management device;
a challenge storage that stores the hashed challenge data output by the challenge output device;
a combination data input device that inputs the encrypted combination data output by the management device;
a decryption device that decrypts the encrypted combination data input to the combination data input device in units of the blocks; and
a data utilizing device that compares the hashed challenge data included in the combination data decrypted by the decryption device and the hashed challenge data stored in the challenge storage, utilizes the hashed predetermined data included in the combination data decrypted by the decryption device in a case where both hashed challenge data are identical, and is prohibited from utilizing the hashed predetermined data included in the combination data in a case where both hashed challenge data are not identical.

* * * * *